(No Model.)
C. M. KARDELL.
SAW SETTING DEVICE.
No. 499,789. Patented June 20, 1893.
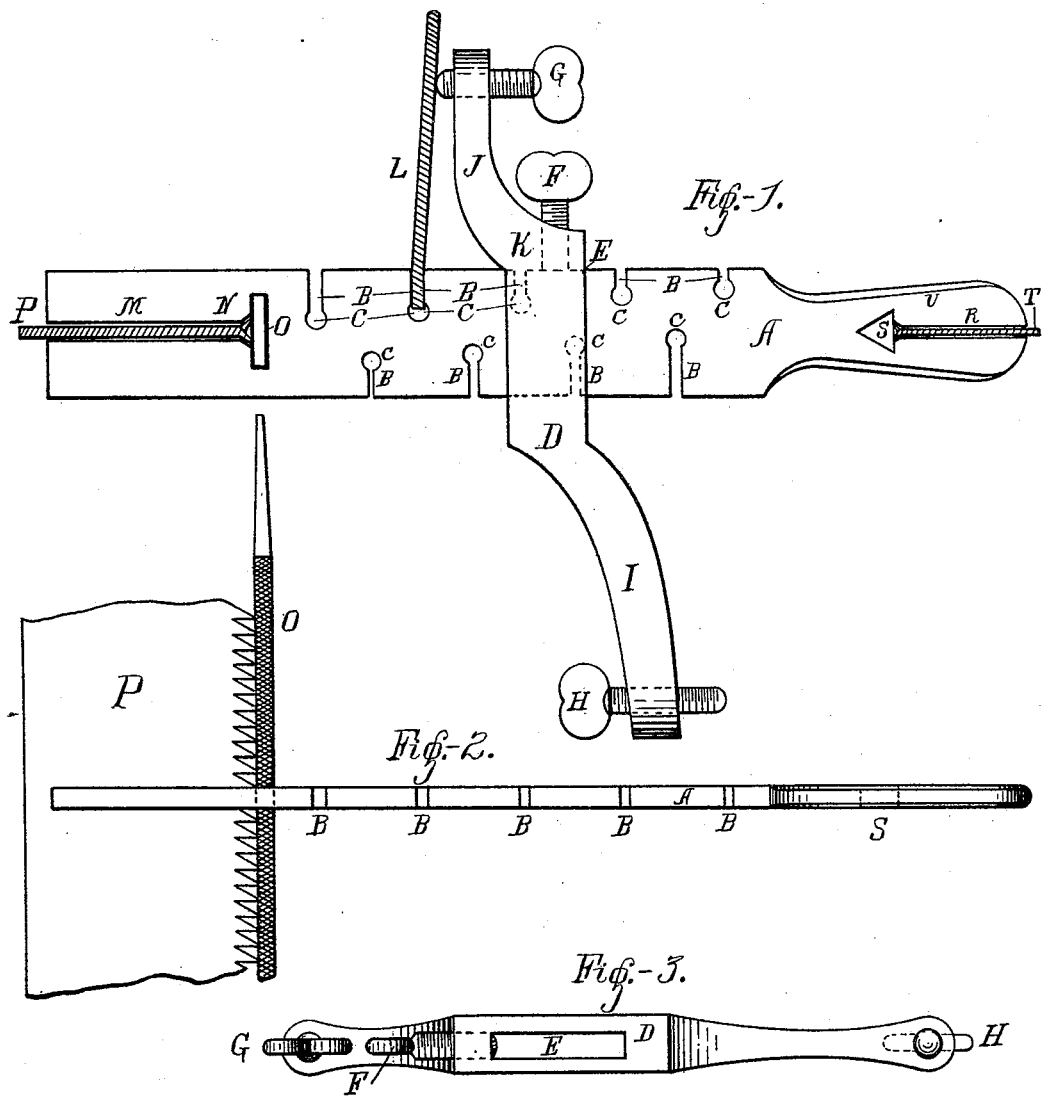
Witnesses:
Emil Ellingsen
Jno. F. Obillander
Inventor.
Carl M. Kardell
By A. M. Carlsen
Attorney.
THE NORRIS PETERS CO., PHOTO-LITHO., WASHINGTON, D. C.

UNITED STATES PATENT OFFICE.

CARL M. KARDELL, OF MARSHFIELD, OREGON.

SAW-SETTING DEVICE.

SPECIFICATION forming part of Letters Patent No. 499,789, dated June 20, 1893.

Application filed May 24, 1892. Serial No. 434,237. (No model.)

*To all whom it may concern:*

Be it known that I, CARL M. KARDELL, a citizen of the United States, residing at Marshfield, in the county of Coos and State of Oregon, have invented certain new and useful Improvements in Saw-Setting Devices; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in devices for setting the teeth of saws.

The objects of the invention are: first, to provide a saw-setting device by which saw teeth of all ordinary sizes may be set with accuracy to any desired degree of setting; second, to provide a saw setter in which the sharp points of the saw teeth are protected by a clearance in the setting tool; third, to provide a saw-setting tool that will facilitate the truing up of the saw teeth to even lengths and at right angles with the saw blade. I attain these objects by the novel construction and arrangement of parts illustrated in the accompanying drawings in which—

Figure 1 is a side view of my complete saw setter, with a saw blade shown in section in different positions, for the different operations by the tool upon it. Fig. 2 is an edge view of the main blade or body of the device. Fig. 3 is an edge view of the adjustable cross guide bar shown in Fig. 1 as placed upon the blade or body of the device.

Referring to the drawings by letters, A designates a parallel steel blade provided at both edges with notches B, B, of various sizes and depths for the different sizes of saw teeth to pass into in setting them. The bottom portions C, of said notches are enlarged so as to form a clearance for the sharp point of the saw tooth, thereby protecting the latter from getting dulled against the sides of the notches.

In order to provide a sufficient large number of notches B, of various sizes and depths without weakening the blade, I commence with deep notches near the handle and make them shallower toward the front end of the blade, on one side of it, and at the other side I commence near the handle with shallow notches and make them deeper the nearer they get to the front end of the blade; for the same purpose I also place the notches at one side of the blade opposite the solid blade portions between the notches at the other side of the blade.

D, is a cross-bar with a hole E, through it for the tempered steel blade A, to fit snugly into. This crossbar D, is reversible and adjustable to any place on the steel blade and is set tightly upon the blade by a thumb screw F. At each end of the said crossbar or guide bar D, I provide vertically arranged thumbscrews G, and H, against the points of which the side of the saw blade touches in setting the saw. The amount of setting is regulated by the adjustment of the guide bar D, upon the blade A, and further by the thumb-screws G, and H. The one end I, of the guide bar D, is longer than the other so as to make it more adapted for extra wide saw blades. The shorter end J, is offset edgewise so as to form a shoulder K, for the thumbscrew F, to be tapped through the press with its point against the edge of the steel blade A.

L, represents the end or section of a saw blade in the act of being set. The steel blade A, is further provided at one end with a slot or deep notch M, terminating in a vertical slot N, into which a flat file O, may be stuck for the purpose of filing evenly the points of the teeth of a large saw P, which may be placed in the slot M, and drawn over the file O; or the file and saw setter may be moved upon the saw blade. The other or handle shaped end of the blade A, is provided with a smaller slot R, for truing the teeth of a smaller saw T, by moving it back and forth upon the side of a three-cornered file which is stuck into the triangular hole or notch S, into which the slot R, opens. Both of the slots R, and M, are slightly widened or V-shaped where they approach the slots N, and S, so as to give room for the set or outwardly spread saw teeth to pass through the slot near by the surface of the file.

Having thus described my invention, what I claim, and desire to secure by Letters Patent, is—

1. In a saw setting device the combination of the parallel steel blade or bar A, having the handle-shaped portion U, and vertically arranged notches B, arranged and located relatively to each other and to their size in the order shown, with the transversely arranged reversible guide bar D, having a thumb set screw as F, a short arm J, and a long arm I, and the adjustment screws G and H, substantially as shown and described and for the purpose set forth.

2. A saw setting device consisting of a solid steel blade A, having a body with parallel sides provided with small and large setting notches B, of the shape and arrangement shown, a handle portion as U, provided with the triangular aperture S, adapted to receive and hold by frictional contact an ordinary triangular saw file, the parallel slot R, extending from the extreme rear end of the handle into the said aperture, near which it has a V-shaped enlargement for the saw teeth to move through, said blade also having near its front end the aperture O, adapted to receive and hold a flat file, and a deeper and wider parallel slot M, V-shaped near by the file, for the jointing of saws too large for the slot in the handle end, substantially as shown and described and for the purpose set forth.

In testimony whereof I affix my signature in presence of two witnesses.

CARL M. KARDELL.

Witnesses:
ADOLPH SANDQUIST,
BETSEY SANDQUIST.